US009716968B2

(12) United States Patent
Mansuri et al.

(10) Patent No.: US 9,716,968 B2
(45) Date of Patent: Jul. 25, 2017

(54) INTERMODAL ASSET IDENTIFICATION AND ASSOCIATION SYSTEM

(71) Applicants: REFRIDGERATED TRANSPORT TECHNOLOGIES LLC, Lakehurst, NJ (US); Advent Intermodal Solutions, Murray Hill, NJ (US)

(72) Inventors: Parvez Mansuri, Princeton, NJ (US); Mark Heck, Toms River, NJ (US); Sean Maguire, Doncaster (AU)

(73) Assignees: REFRIDGERATED TRANSPORT TECHNOLOGIES LLC, Lake Hurst, NJ (US); ADVENT INTERMODAL SOLUTIONS, Murray Hill, NJ (US)

( * ) Notice: Subject to any disclaimer, the term of this patent is extended or adjusted under 35 U.S.C. 154(b) by 0 days.

(21) Appl. No.: 15/134,050

(22) Filed: Apr. 20, 2016

(65) Prior Publication Data
US 2016/0304054 A1    Oct. 20, 2016

Related U.S. Application Data

(60) Provisional application No. 62/149,832, filed on Apr. 20, 2015.

(51) Int. Cl.
*H04W 4/00* (2009.01)
*B60R 25/102* (2013.01)

(52) U.S. Cl.
CPC .......... *H04W 4/008* (2013.01); *B60R 25/102* (2013.01)

(58) Field of Classification Search
CPC ..... B60R 25/01; B60R 25/241; B60R 25/102; H04W 4/008
See application file for complete search history.

(56) References Cited

U.S. PATENT DOCUMENTS

| | | | |
|---|---|---|---|
| 5,240,271 A | 8/1993 | Hart et al. | |
| 6,076,380 A | 6/2000 | Hulak | |
| 2003/0233189 A1* | 12/2003 | Hsiao | G08G 1/20 701/521 |
| 2005/0134429 A1 | 6/2005 | Bates | |
| 2006/0202817 A1* | 9/2006 | Mackenzie | G06Q 10/08 340/539.13 |
| 2007/0125581 A1 | 6/2007 | Busuttil et al. | |
| 2008/0252417 A1* | 10/2008 | Thomas | B66C 13/46 340/10.1 |
| 2008/0303648 A1* | 12/2008 | Day | B60D 1/62 340/431 |
| 2011/0137773 A1 | 6/2011 | Davis, III et al. | |
| 2011/0148589 A1 | 6/2011 | Johnson et al. | |
| 2013/0147617 A1* | 6/2013 | Boling | G08B 21/18 340/431 |

(Continued)

OTHER PUBLICATIONS

International Search Report and Written Opinion for International Patent Application No. PCT/US2016/028471; dated Jul. 25, 2016.

*Primary Examiner* — Leon Flores
(74) *Attorney, Agent, or Firm* — Barnes & Thornburg LLP

(57) ABSTRACT

Systems, methodologies and components enable the ability to assign, manage and use intermodal, bi-modal and tractor/trailer asset associations between shipping assets, for example, container/truck associations, chassis/container associations, chassis/truck associations, trailer/truck associations, associations for gensets, and refrigerated containers, etc.

22 Claims, 3 Drawing Sheets

(56) References Cited

U.S. PATENT DOCUMENTS

| | | | |
|---|---|---|---|
| 2014/0104036 A1* | 4/2014 | Skonberg | G07C 9/00111 340/5.3 |
| 2014/0125501 A1* | 5/2014 | Baade | G01S 19/16 340/989 |
| 2015/0081582 A1 | 3/2015 | Mains, Jr. | |

* cited by examiner

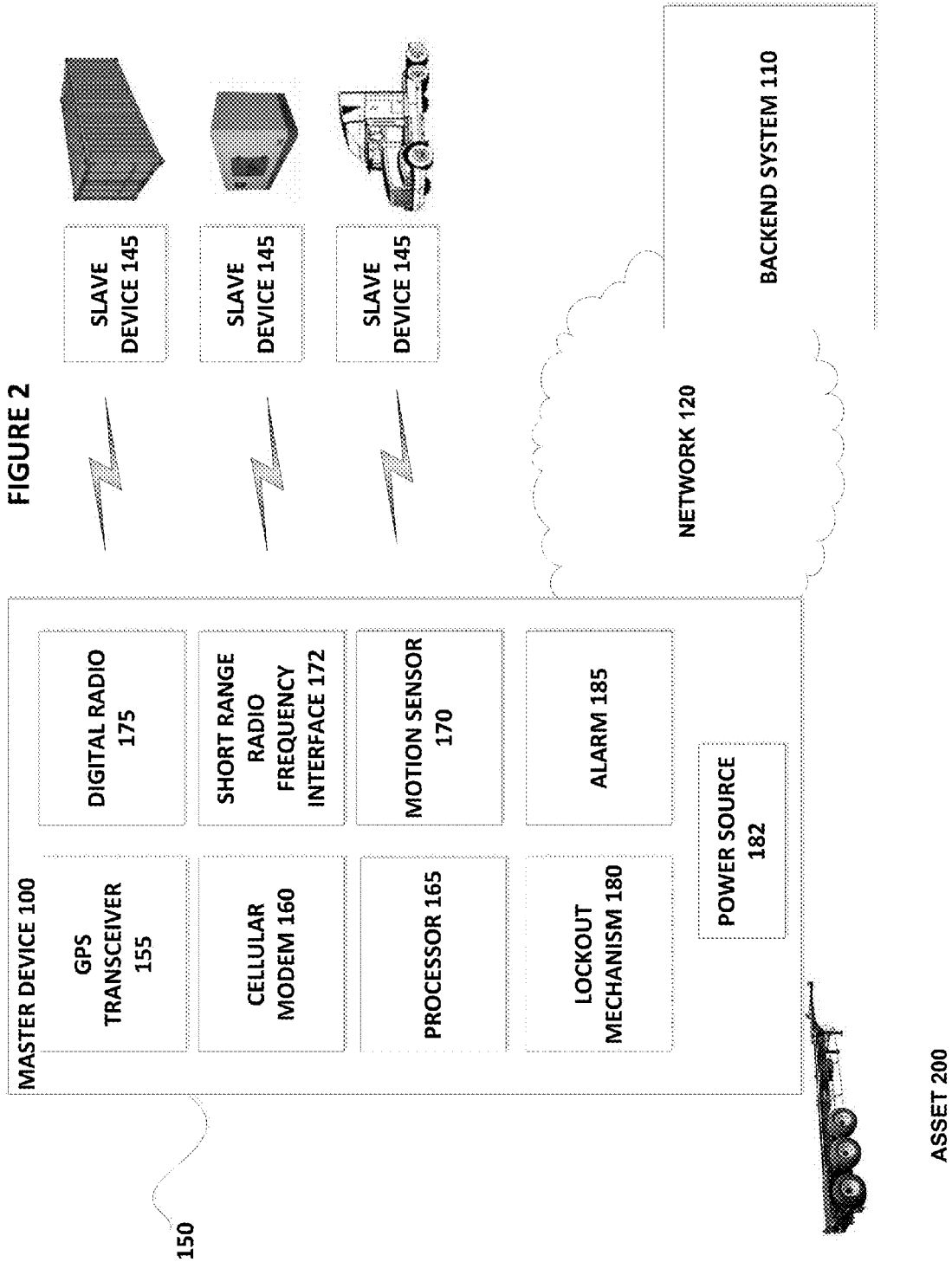

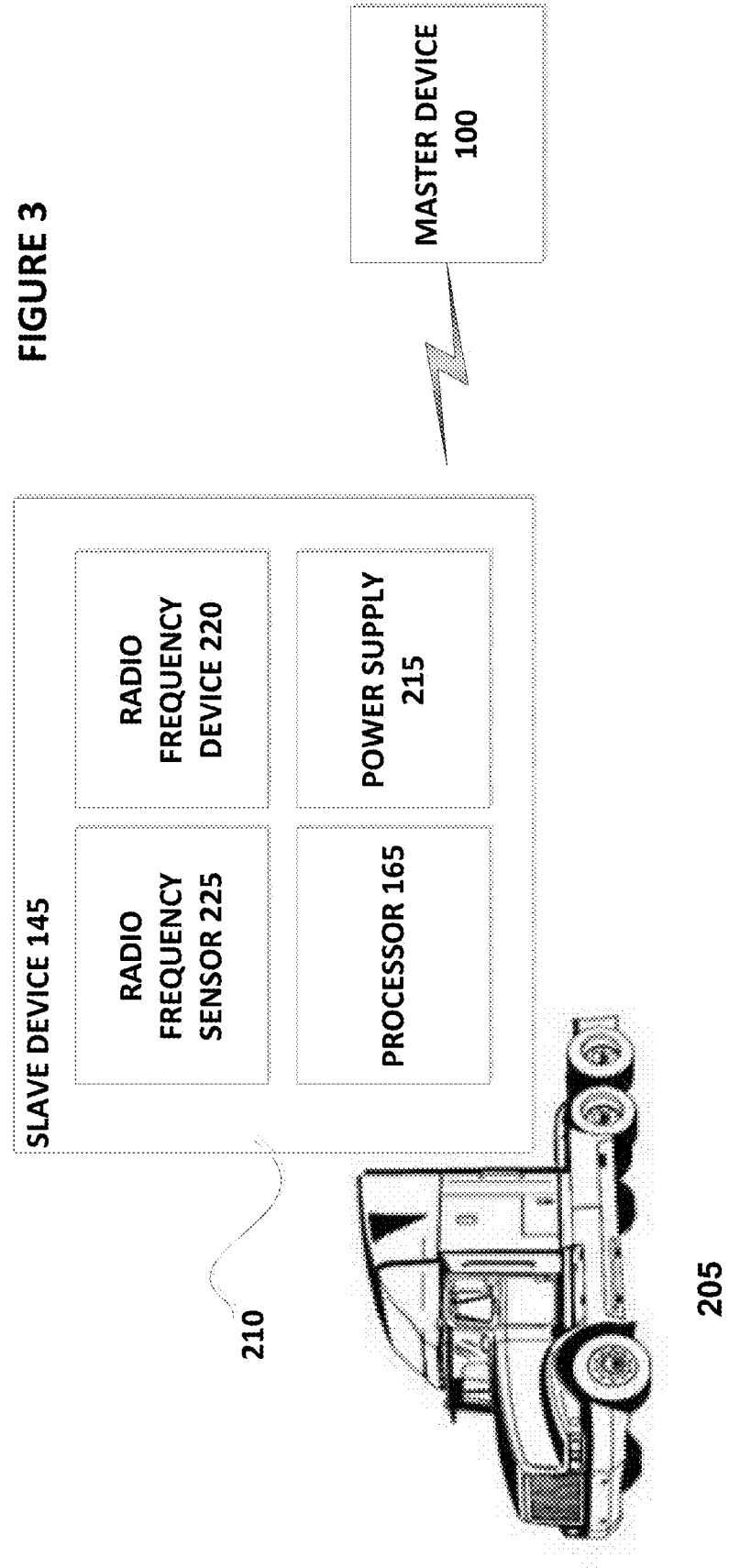

INTERMODAL ASSET IDENTIFICATION AND ASSOCIATION SYSTEM

CROSS-REFERENCE TO RELATED APPLICATION(S)

This application relies for priority on U.S. Provisional Patent Application Ser. No. 62/149,832, entitled "INTERMODAL ASSET IDENTIFICATION AND ASSOCIATION SYSTEM," filed on Apr. 20, 2015, the entirety of which being incorporated by reference herein.

FIELD

The present disclosure relates to intermodal asset associations in the shipping industry as well as bi-modal and tractor/trailer associations when considered to be subsets of intermodal asset associations.

DESCRIPTION OF THE RELATED ART

Intermodal Freight Transport (IFT) involves the transportation of freight in an intermodal container or vehicle, using multiple modes of transportation (rail, ship, and truck), without handling of the freight itself when changing modes. IFT reduces cargo handling, and improves security, reduces damage and loss, and allows freight to be transported faster.

In IFT, shipping assets are frequently paired together throughout a supply chain. In the typical IFT supply chains, shipping containers are unloaded from ships and stored in a terminal or yard. The container is identified manually or using scanning technology when it is offloaded from the ship. The container is loaded onto a chassis and then prepared for transport via truck, rail, barge, or other vessel. The container is associated with the truck or other means of transportation before exiting the terminal. The container/truck association may be completed manually or by Optical Character Recognition (OCR) technology or the like. The container/truck association is generally reliable and error-free, thereby allowing accurate tracking of containers and trucks. Additionally, trailers, e.g., a container that is permanently affixed to its chassis, are trackable in a similar way. The term "container" as used herein is meant to encompass both containers that are either affixed to a chassis or are not affixed but can be carried by or coupled to a chassis.

The typical supply chain associated with the use of trailers is in general limited to over-the-road shipping and can be explained with reference to its two most typical use cases: Full Truck Load (FTL) and Less than Full Truckload (LTL).

In FTP shipments, a container is loaded at a particular location from where a tractor picks it up and drives it directly to the place, where it will be unloaded, or to an intermediate point, where the container may be dropped off for another tractor to continue the journey.

LTL carriers use "hub and spoke" operations, in which local terminals are the spokes (e.g., 'end of line') and larger more central terminals are the hubs or Distribution Centers. Spoke terminals collect local freight from various shippers and consolidate that freight onto enclosed containers (affixed to or coupled to a chasis) for transporting to the delivering or hub terminal where the freight will be further sorted and consolidated for additional transporting. In most cases, the end of line terminals employs local drivers who start the day by loading up their containers and sending them out on deliveries. Then, when the container is empty the local driver begins making pickups and returns to the terminal for sorting and delivery next day.

Bi-modal transport is an extension of the use of trailers that allow containers to not only be transported over the road, but also on rail. Bi-modal, uses specialized trailers that can go on rail and utilize flat cars that permit Trailer Overt Flat Car (TOFC) shipping. Bi-modal transport enables FTL shipments to switch between over-the-road and rail transport similarly to the ways containers do, thus enabling the inherit savings associated with rail transport for long distance trips.

SUMMARY

Disclosed embodiments provide the ability to assign, manage and use intermodal, bi-modal and tractor/trailer asset associations between shipping assets.

In accordance with illustrated embodiments, these associations may include container/truck associations, chassis/container associations, chassis/truck associations, tractor/trailer associations, associations for generator sets ("gensets") and refrigerated containers.

BRIEF DESCRIPTION OF THE FIGURES

The above and other aspects, features, and advantages of the present disclosure will become more apparent in light of the following detailed description when taken in conjunction with the accompanying drawings in which:

FIG. 2 is an illustration of one implementation of components of the disclosed embodiments of an intermodal asset identification and association system including a master device and slave device.

FIG. 3 is an illustration of constituent components of a slave device in accordance with disclosed embodiments of an intermodal asset identification and association system.

DETAILED DESCRIPTION

Figure 1:
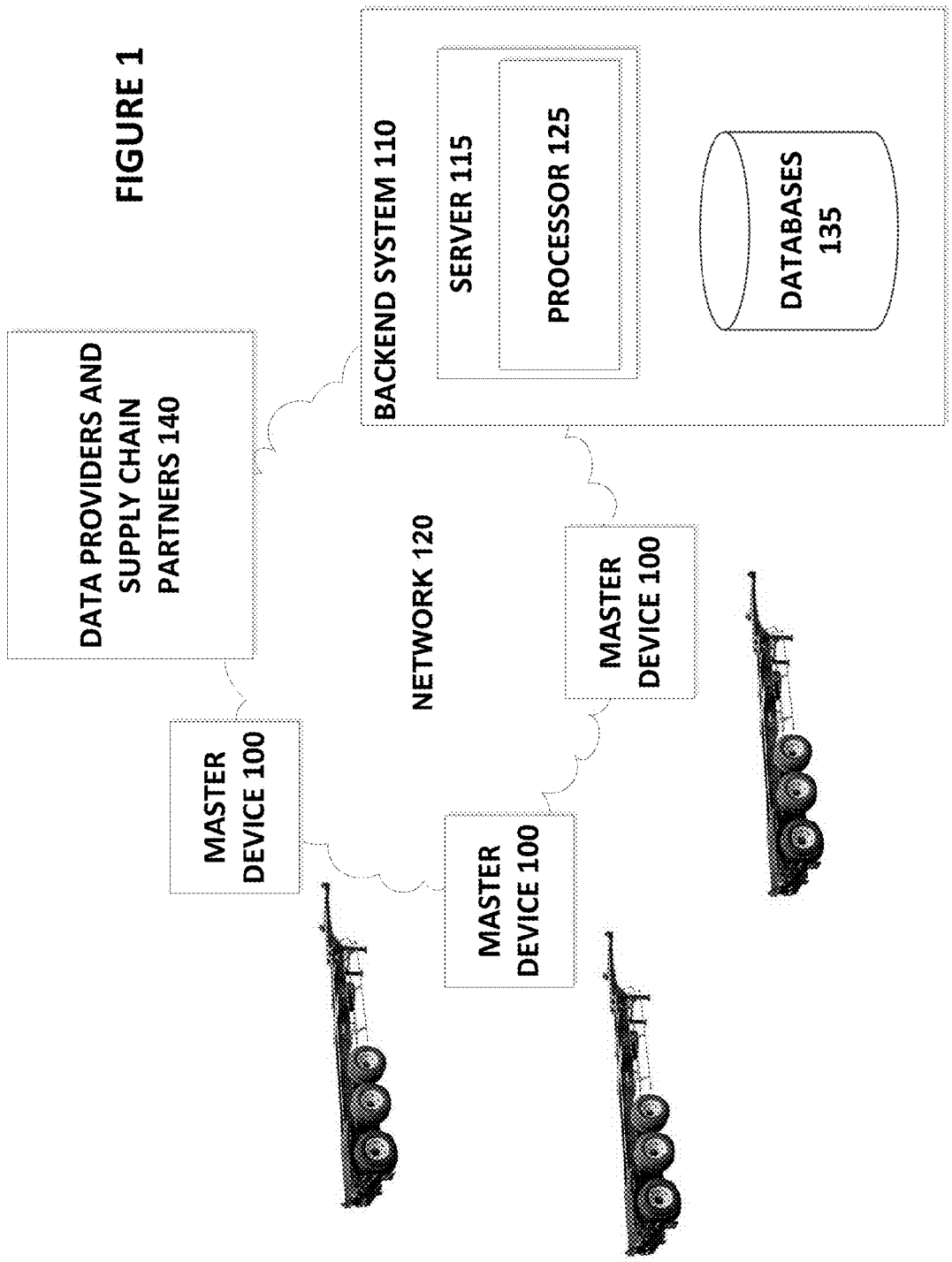
FIG. 1 is a schematic drawing of disclosed embodiment of an intermodal asset identification and association system.

Embodiments of the present disclosure will be described herein below with reference to the accompanying drawings. In the following description, well-known functions or constructions are not described in detail to avoid obscuring the present disclosure in unnecessary detail.

Chassis are assets that typically sit in a container terminal, yard or rail ramp and when needed are connected (coupled) to a towing truck and using a container lift crane, are loaded with a container and transported via road or rail or barge or vessel to the destination. The chassis and container combination may then be left at the destination for loading or unloading of cargo. Sometime later, the towing truck returns and couples to the chassis again and tows the chassis container combination back to the depot/yard etc. where the container may be loaded to a ship or stored in the yard and the chassis is returned to its storage location. For the purpose of streamlining an explanation of the disclosed embodiments, the chassis will be considered the master asset and the truck will be considered the slave asset; however, it should be understood that this is not the only configuration, as explained herein.

Conventionally, in the IFT industry, individual chassis are not associated with either a container resting on the chassis or a truck coupled to the chassis. Thus, tracking of chassis is unreliable, particularly in terminals that rely solely on manual association. Similarly, gensets attached to containers, particularly refrigerated containers, are not reliably associated with trucks and are not properly tracked. Moreover, use of Optical Character Recognition (OCR) technology is unreliable with regard to identification and tracking of chassis and gensets. With Chassis, the design is such that the main structural beams of the chassis, that usually have the chassis ID painted onto, are well inboard from the side of the container side. That is, the chassis beams (and thus ID) are obscured from OCR cameras plus these beams ae usually covered in road dirt. Reading the genset ID is less an issue of obscurity and more about the limited range of reading angles of the OCR and the unusual position of the genset ID.

The inability to reliably track chassis and gensets creates several issues in the shipping industries. Significantly, chassis and genset management companies cannot properly allocate chassis and genset inventory to terminals and shipping yards. Using conventional systems and technology, companies are only aware of the location of their chassis and gensets if the units are properly associated with a truck or container when leaving a terminal Thus, companies are generally unaware if a chassis or genset has left a terminal and who/what company has taken the equipment. As a result, chassis and genset inventory levels cannot be accurately monitored at terminals and the location of units cannot be accurately determined.

Further, the chassis and genset management companies are often unaware of the length of time that each unit is in use and the particular trucking company that is using each unit. Hence, it is difficult for the management company to properly invoice the equipment users (e.g., trucking companies) or to assess demurrage and late charges when chassis and gensets are not returned on time.

Unauthorized use of trailers or incorrect association of truck to trailer results in both rerouting issues and safety risks. For example, in the event a trailer is not yet authorized for travel, there may be warehouse equipment/personnel actively loading a trailer while a truck driver is attempting to hook up and drive away; this can result in potential safety incidents. Likewise, rerouting issues are caused by incorrect association of truck and trailer, which common in intermodal or domestic transportation.

To address these issues and to improve management of shipping assets, a system, methodologies and components are provided for tracking and identifying users of chassis, gensets, and other assets associated with the shipping industry. Thus, in accordance with illustrated embodiments, a system, methodologies and components are provided that enable the ability to assign, manage and use intermodal asset associations between shipping assets, for example, container/truck associations, chassis/container associations, chassis/truck associations, associations for gensets, and refrigerated containers, etc.

The solution provides locating, monitoring, tracking and truck/towing association of container chassis, and gensets at container ports, yards, rail ramps, on ships or wherever such assets are managed, transported, held, stored or transshipped, through the use of wireless and Radio Frequency (RF) technology. The solution allows owners and managers of such assets to maintain a real time inventory count, their location and the state of use, whether in tow or in storage and the identity of the vehicle doing the towing.

Disclosed embodiments provide an intermodal asset identification and association apparatus and system for tracking shipping assets. The apparatus and system enable tracking and management of shipping assets via wireless technology. FIG. 1 is a schematic drawing of disclosed embodiment of an intermodal asset identification and association system. As shown in FIG. 1 a master device 100 is coupled to and in combination with a backend system communicating 110 via at least one communication network 120. The backend system 110 may include at least one server 115 running software on at least one processor 125 that enables the management and recording of data in one or more memories 130 including one or more databases 135. The data stored in these databases 135 may include data indicating identification of master devices 100 (and slave devices in some implementations) and shipping assets to which those devices are specific, e.g., a truck, a container, a generator set ("genset"), or a rail car.

Additionally, the databases 135 may include data communicated to the backend system 110 from master devices 100 as well as third party data providers and supply chain partners 140. As a result, the backend system may also include an interface to one or more of the providers and partners to facilitate data communication between the backend system 110 and the providers and partners 140. For example, the backend system 110 may be configured to communicate with one or more shipping databases administered by one or more shipping facilities, carriers, etc., to identify pairing of shipping assets.

In accordance with at least one implementation, each of the master devices 110 may be configured to report preselected data to the backend system 110 via the one or more communication networks 120, for example, the Internet, intranets, one or more wireless networks, e.g., a Wireless Local Area Network (WLAN), etc.

It is conventionally understood and known that motor carriers operating in interstate, intrastate and foreign commerce are required to register various information with the shipping ports and terminals where they receive cargo. The National Motor Freight Traffic Association (NMFTA) assigns the Standard Carrier Alpha Code (SCAC), a unique two-to-four-letter code used to identify transportation companies, and publishes the Directory of SCACs. NMFTA also assigns the Standard Point Location Code (SPLC), a numeric coding system designed to identify points in North America that originate and receive transportation with their geographic locations. Additionally, NMFTA produces SPLC Online, an internet-based system for retrieval of SPLC data.

Thus, it should be understood that the backend system 110 includes software that stores and analyzes SCAC and SPLC data including but not limited to a driver's company's SCAC code, company name, address, contact information, motor carrier permit number or Department of Transportation (DOT) number, a list of ports which a driver is registered, etc.

Thus, in accordance with at least one embodiment, the backend system may be running software that enables or is coupled to intermodal data systems for truck registries, appointments, dispatching, chassis rental billing and Maintenance and Repair (M&R) (e.g., EMODAL®). In this way, the backend system 110 may be configured to provide equipment statuses and data sharing capabilities across a supply chain.

FIG. 2 is an illustration of one implementation of components of the disclosed embodiments of an intermodal asset identification and association system including a master device 100 and slave device 145. In such an implementation, the master device 100 and the optional slave device 145 may cooperate and be coupled wirelessly or wired to provide communication between the two devices via. Thus, the master device 100 and the slave device 145 may be configured to use various wireless transmission protocols to communicate with one another and other components within the system. Alternatively, they may be configured to communicate using fixed communication lines coupled to the components via cables or other signal transfer lines and/or wirelessly.

As illustrated in FIG. 2, the master device 100 may be configured to be attached to a master shipping asset 200, e.g., a chassis. However, the master asset 200 may be any shipping asset, including, but not limited to, a truck, a container, a generator set ("genset"), or a rail car. In one implementation, the master device 100 may be attached at a forward position of the asset 200.

In this implementation of the master device 100 illustrated in FIG. 2, the master device 100 may include a housing 150 that may include at least a Global Positioning System (GPS) transceiver 155, a cellular modem 160, and a computer processor 165 running software used to control the other components included in the housing 150. The master device 100 may include a short range radio frequency interface 172, which may be configured to communicate with radio frequency sensors within a predetermined range of the short range radio frequency interface 172. The interface 172 may utilize Near Field Communication (NFC) technology to communicate with other equipment such as NFC enable mobile devices, Radio Frequency Identification Data (RFID) tags, etc. The master device 100 may further comprise a motion sensor 170, a digital radio 175, such as a ZIGBEE® device, and/or an impact sensor.

Thus, the master device 100 may include components that are conventionally understood to use electromagnetic fields to transfer data, to identify and track RFID tags or sensors attached to objects. The tags contain electronically stored information. Depending on the implementation, the tag may be powered by electromagnetic induction from magnetic fields produced near the reader, i.e., the short range radio frequency interface 172. For example, it may collect energy from the interrogating radio waves emitted by the interface 172 and act as a passive transponder. Other types of tags may have a local power source such as a battery.

Thus, in accordance with at least one embodiment, the system may be implemented using Near Field Communication (NFC) technology or BLUETOOTH® technology to obtain identification and tracking data and using software to map or associate the identification and tracking data to registration data.

Since, conventionally, every truck driver is required to register with the shipping ports they visit, disclosed embodiments can associate chassis identification data with truck data and/or driver data when the chassis is taken from a terminal.

In accordance with at least one embodiment, driver ID data may be obtained via NFC interrogation by the maser device 100 of a RFID tag attached to a driver ID badge, keys to the driver's truck, or attached to or included within a driver's mobile phone. Likewise, in accordance with at least one embodiment, truck ID data may be obtained by via NFC interrogation by the master device 100.

In accordance with the disclosed embodiment of FIG. 2, the system may also include a seven way connector or gladhand connector lockout mechanism 180 and/or an audible alarm 185.

Further, the master device components may be powered by a power supply 182 which may be implemented as a battery, e.g., a rechargeable battery that may be recharged whenever the asset is coupled to charge source, e.g., voltage running on a connector or by solar energy inbuilt to the master or connected to the master as a separate powering source.

It should be understood that the components of the master device 100 are coupled to one another to facilitate communication and cooperation to provide the disclosed functionality.

The audible alarm 185 may be configured to generate an audible alarm if the master device 100 and/or the seven way connector lockout mechanism 180 is physically tampered with.

Alternatively, the audible alarm 185 may sound if the seven way or gladhand connector is connected to a truck without a user first requesting an unlock signal verification from the backend system (illustrated in FIG. 1) as discussed herein.

The seven way connector or glad hand lockout mechanism 180 may be implemented as part of the master device 100 or a separate device that communicates to the master device 100 via wired connection or wireless connection (as option component 180 of the master device 100 is indicated in dashed lines). Thus, in accordance with at least one embodiment, the lockout mechanism 180 can be a physical device or software implemented as part of the master device 100 that physically prevents a driver from connecting a truck's seven way or gladhand connector to a shipping asset, e.g., chassis or trailer, unless it is unlocked. In this way, the interaction of the master device 100 and the lockout mechanism 180 controls coupling of the truck to a chassis or a trailer.

The lockout mechanism 180 may be implemented in part as a physical cover that clamps around/over a chassis or trailer seven way or gladhand connector that would impede or prevent its mating from a truck from attaching to a corresponding connector on the shipping asset, e.g., a chassis or trailer. In this way, the lockout mechanism 180 may impede or prohibit the driver from connecting to and towing the chassis or trailer. The lockout mechanism 180 may also include a mechanical mechanism or a hydraulic mechanism, activated by a small motor or actuator or any means to release the cover so the user can attach the truck connector.

To unlock the lockout mechanism 180, a driver may be required to input a code or key to facilitate unlocking of the mechanism. This may include, for example, one or more of a number of mechanisms such as use a NFC enabled device, e.g., an NFC enabled mobile phone or card, brought into close proximity to the master device 100 or the lockout device 180.

This configuration and cooperation enables the master device 100 and/or lockout device 180 to relay RFID tag data or phone identification data (e.g. A-subscriber phone number), to the backend software system 110 illustrated in FIG. 1. This enables the backend system 110 to identify, verify and record identification data of the driver and/or truck and obtain authorization to allow the master device 100 to send a signal to the lockout device/mechanism 180 to be unlocked, e.g., unlocking the cover over the seven way or gladhand connector 180 so the driver can connect the truck to the asset. When the implementation is configured to data transmission via a driver's mobile phone, a Short Message Service (SMS) message may be sent by the mobile phone or the master device 100 with a serial number or identification number of the master device 100 or lockout device 180 to the backend server. Once a driver's and/or truck's identity has been verified and authorization has been confirmed by the backend system 100, the system may transmit a SMS, UDP or TCP message back to the master device 100 to unlock the lockout device 180.

That is, a user, e.g., driver may place his NFC-enabled phone or NFC card in close proximity to the master device 100 with the optional inbuilt or separate locking mechanism 180 and the master device 100 may facilitate verification and authorization via communication with the backend system 110. Following authorization, the backend system 110 may transmit a signal to trigger an audible tone emitted from the master device 100 or the lighting up of an indicator light on the master device 100 as an indication that the driver is authorized to connect to and tow the chassis or trailer. If the does not attempt to obtain verification or if this verification fails, an audible tone (different than that emitted to indicate authorization) may be triggered and emitted from the master device 100 as long as the seven way or gladhand connector is connected.

It should be understood that at least one embodiment of the system may operate without the use of a slave device. In such an implementation. The master device 100 could interact with a RFID tagged badge or NFC enabled mobile device of a driver to provide necessary information to obtain authorization to tow the device. Optionally, such an implementation could unlock the lockout device 180 without the use of a slave device 185.

However, as mentioned above, and optionally illustrated in FIG. 2, in accordance with one embodiment implementation, the system may also include an optional slave device 145 (as those devices 145 is indicated in dashed lines) that may be mounted on a slave asset. FIG. 3 is an illustration of constituent components of a slave device in accordance with disclosed embodiments.

The slave asset 205 may be, for example, a truck or any other shipping asset, including, but not limited to a chassis, a trailer, a container, a genset, or a rail car. As illustrated in FIG. 4, the slave device 145 may be mounted on a slave asset 205 and comprise housing 210 that includes a power supply 215 that may be implemented as a self-contained solar battery device or a coupling to an external supply of power, e.g., powered by the asset 205 to which it is attached. Thus, the slave device 145 need not require a wired power source for operation. The slave device 145 further comprises a radio frequency device 220 for transmitting identifying information relating to the slave device 145 and a radio frequency sensor 225.

It should be understood that the components of the slave device 145 are coupled to one another to facilitate communication and cooperation to provide the disclosed functionality.

The radio frequency device 220 may transmit the identifying information continuously or at preselected intervals. The radio frequency device 220 may also transmit the identifying information by request. The slave device 145 may be, for example, as illustrated in FIG. 2, mounted at a rearward position of the asset, e.g., a truck so as to be in close proximity to the master device 140 when the chassis is connected to the truck.

Such a configuration enables detection of the radio frequency sensor 225 by the short range radio frequency interface 172 of the master device 100 (see FIG. 2). In this way, the master device 100 can report detection of the slave device 145 to the backend system 110 (see FIG. 1) via the cellular modem included in the master device 100. In turn, the backend system 110 can interface and communicate with shipping databases to associate the master asset with the slave asset 205.

In one potential implementation for use in a chassis or trailer truck pairing, the master device 100 may be connected to a seven pin wiring harness on a chassis. The master device 100 may be configured to detect a signal, e.g., voltage, in the harness, and thus can determine if the chassis is connected to a truck. The master device 100 may further be configured to initiate operating modes when a connection between the chassis and truck is detected. For instance, the master device can initiate a reporting schedule or trigger connected or disconnected events.

The reporting schedule (frequency) or reporting trigger, may be driven by operational conditions. For example, if the chassis is stationary and not connected to a truck it may report periodically every day or week or month etc. If the master detects movement, whether powered/coupled or not, it may report more frequently such as every four hours as well as report a 'start of move' message and 'end of move' message upon cessation of movement. If the chassis is coupled/connected to a truck, yet another frequency may be initiated including turning the master device on full power in order to maintain/manage communications with the driver or the truck or with the backend. If the chassis is coupled to a truck and moving at speed that may result in another reporting schedule, maybe every hours for example. If an impact has occurred yet another frequency may be initiated etc.

Therefore, the short range radio frequency interface (172 of FIG. 2) may only be activated when a connection between the master asset 200 and the slave asset 205 is detected. As a result, battery power may be preserved within a slave device (145 illustrated in FIG. 2).

It should be noted that the connection between the master asset 200 and the slave asset 205 would likely occur in a shipping yard in the presence of many other shipping assets 205. As a result, the master device 100 may detect multiple slave devices 145 within range of the short range radio frequency interface 172. Thus, the master device 100 may be configured to identify the correct slave device 145 (i.e. the slave device paired to the master device) based on the strength of the radio frequency signal emanating from the slave device 145. Further, the master device 100 may be configured to detect the movement speed of the slave device 145, thereby confirming the correct pairing of the master device 100 and the slave device. If the master detects multiple slaves, it may use other factors to determine which the right one is. One factor may be speed—while stationary the master may see say 3 slaves but then at say 30 mph it will see only one and that will be the one it's paired with. Furthermore, sometimes chassis are mounted on chassis for long term use and in such case the pairing can be manually associated in the backend software. Furthermore, the driver may have the ability to input via mobile phone the IDs of the things he wants associated and that is recorded and managed thereafter in the backend software.

Still further, it should be understood that the master device 100 may be configured to identify a plurality of slave devices 145 pertaining to a shipping container, a genset mounted thereon and coupled to a chassis connected to a truck. Thus, the slave devices 145 may be mounted on the container, genset, and truck, while the master device is mounted on the chassis. In such a scenario, the master device 145 may be configured to identify and transmit location information for the slave devices of the container, genset, and truck to the backend system 110 so that shipping managers can identify the location of and initiate invoicing for the container, genset, and chassis based on the signal transmission of the master device 100.

In this way, an owner of a particular chassis can determine that the particular chassis is associated with a particular truck as soon as the assets are connected. Thus, the chassis owner can more easily track the location of the chassis and initiate billing of the trucking company for use of the chassis.

However, it should be noted that the disclosed embodiments are not limited to the pairing of a chassis or trailer with a truck. The association of the slave and master asset may include, but is not limited to a coupling of a container and a genset; a container and a chassis; and a chassis and a genset. Further, although the disclosed embodiments have been explained above in terms of a chassis as the master asset 200, the master device 100 may be coupled to any type of shipping asset. Similarly, although the slave asset 205 is defined as a truck, the slave device 145 may be coupled to any type of shipping asset. For example, the disclosed embodiments are particularly useful for coupling of gensets and chassis because some IFT companies with gensets attach gensets to chassis and use genset transponders to track the chassis genset pair.

For example, tracking of shipping assets is greatly improved and owners can allow for widespread use of assets with the knowledge that they can always locate and assign assets and invoice correctly for asset use.

Disclosed embodiments of the intermodal asset association system defined herein have significant utility over the prior art. For example, depending on the implementation of the components of the master and slave devices there is no requirement for a continuous power source for transmitting information to the backend system. More specifically, the master device may be configured to only communicate with the backend system when a connection between a master asset and a slave asset is detected. Thus, maintenance costs may be reduced as the master device only uses power when a connection is detected.

While the disclosure has been shown and described with reference to certain preferred embodiments thereof, it will be understood by those skilled in the art that various changes in form and detail may be made therein without departing from the spirit and scope of the disclosure.

For example, the short range radio frequency interface 172 on the master device 100 illustrated in FIG. 2 may be replaced by any known communication device suitable for detecting a slave device 145 within proximity to the master device 100.

It should be understood that, in accordance with at least one embodiment, a chassis or trailer specific device may include a tag that includes chassis or trailer ID data and a driver's mobile phone may be NFC enabled and may run dedicated software that interrogates the tag of the chassis or trailer specific device to obtain chassis or trailer ID data. Further, in accordance with at least one embodiment, truck ID data and chassis or trailer ID data may be obtained by software running on a driver's NFC-enabled mobile device via NFC interrogation of a tag specific to the driver's truck and the tag specific to the chassis coupled to the truck at the terminal. Thus, in one implementation the software running on the driver's NFC-enable mobile device could communicate with the backend system (110 illustrated in FIG. 1) to provide the necessary identification, verification, recordation and authorization. In such an implementation, the NFC-enabled mobile device could communicate with the master device to enable coupling of equipment. Such communication may be performed through NFC communications or SMS communications between the devices.

In such implementations, authorization may be indicated on the master device by triggering a switch from a red light (no authorization) to a green light (authorization) or (as explained above) audible tones to denote authorization or coupling without authorization.

Disclosed embodiments solve a technical problem that shipping containers and other shipping assets gate out for delivery to customers, for example, and identification of neither the chassis container sits on nor the genset attached to it get captured. This results in the owner of those assets having no knowledge of their whereabouts, which makes it very difficult to plan and load balanced assets across an IFT network to meet demand Conventionally, this has resulted in additional assets being purchased to meet location demand while the same assets sit underutilized in an unknown or wrong location. Furthermore, the owner of the chassis and genset often needs to invoice the trucking company or other party for the use of the asset and for demurrage or late charges associated with not returning the asset on time. This has always been a problem for containers, the most visible of the assets in the intermodal supply chain, but is even more of a problem for the owners of associated paired assets such as chassis and gensets for the reasons outlined above.

The disclosed embodiments provide a technical solution for this problem and improve the ability of the asset owner to locate and invoice fully for the use of these assets with a clear audit trail. This technical solution includes associating the assets with each other to provide a better picture of the asset movement and assist with the billing and demurrage invoicing.

This technical solution is implemented in a number of different ways including coupling detection, asset identification via NFC interrogation, an asynchronous communication to minimize power use, and associated authorization and security mechanisms.

For example, coupling detection is enabled by the master device being configured to detect when there is voltage on a conventional seven pin wiring harness of the chassis, indicating that it is connected to a truck and ready for or being towed. This allows the device to initiate certain operating modes such as switching on a particular reporting schedule, or trigger connected/disconnected events.

Likewise, truck identification via short range RF interface, RFID and NFC interrogation enables a slave device on a truck, which couples with the chassis, to be detected by the chassis device and the truck ID reported to the backend software. The backend software would then interface with a public or private truck ID database of truck IDs/reg to identify which truck has picked up the chassis and thus be able to associate the chassis with the truck for that particular move. This technical solution is particularly useful to asset owners because it facilitates initiating billing of a trucking company for the use of the chassis and greatly improves the auditing trail.

Further, by implementing the communication from the master device to the backend system in an asynchronous manner, power usage is minimized. This technical implementation maximizes return on investment for the master device on each chassis, because the master device needs to continue to report location and other data for as long as possible and ideally for the life of the chassis. This is challenging because the chassis need not have a power source to power the master device; thus, the master device may need to rely on a battery to keep reporting.

To the contrary, if the master device were configured to continuously scan on the RF channel for any truck mounted RF sensors, it would very quickly use up a battery. Disclosed embodiments overcome that by not initiating wireless scanning until a master device has detected power on the chassis harness which is energized only when connected to a truck.

Thus, when the master device detects power on the connected harness, it will switch on the RF scanner or similar interrogation components explained above to look for nearby slave devices. As explained above, it may detect none or some sensors and may then use an elimination process to select the correct slave device, e.g., truck. This can be performed based on signal strength and potentially coupled with movement speed so that there is a high degree of confidence.

As well as triggering the coupling of a truck, the connection to the chassis wiring harness also provides an opportunity for the device battery to be charged during the full connection time.

It should be understood that RFID is the process by which items are uniquely identified using radio waves, and NFC is a specialized subset within the family of RFID technology. Specifically, NFC is a branch of High-Frequency (HF) RFID, and both operate at the 13.56 MHz frequency. NFC is designed to be a secure form of data exchange, and an NFC device is capable of being both an NEC reader and an NFC tag. This unique feature allows NFC devices to communicate peer-to-peer. Thus, it should be understood that the term "RFID" encompasses an NFC implementation as well as other RFID implementations.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the invention.

We claim:

1. A tracking system that associates a chassis or trailer with a truck connecting to the chassis or trailer and provides information to a server that indicates the connection so as to begin an association between the truck and the chassis or trailer, the tracking system comprising:
    means for obtaining truck and/or driver identification data by performing Radio Frequency Identification Data (RFID) interrogation of a tag or device associated with the truck and/or driver;
    means for communicating the truck and/or driver identification data to a server that runs software that identifies, verifies and records the identification data of the driver and/or truck, associates the truck with the chassis or trailer, and obtains authorization for the driver to connect the truck to the chassis or trailer; and
    means for receiving the authorization and unlocking a locking mechanism that cover a seven way or gladhand connector that connects the truck to the chassis or trailer.

2. The system of claim 1, wherein the means for obtaining truck and/or driver identification data includes a master device coupled to the chassis or trailer and a slave device coupled to the truck, wherein when the master device and the slave device are in close proximity to each other the master device interrogates the slave device to obtain the truck and/or driver identification data.

3. The system of claim 1, wherein the means for obtaining truck and/or driver identification data includes a master device coupled to the chassis or trailer and including an interface that interrogates an Near Field Communication (NFC) enabled mobile device associated with the driver which communicates with the master device to provide the truck and/or driver identification data.

4. The system of claim 1, wherein the locking mechanism is a seven way or gladhand connector lockout mechanism.

5. The system of claim 1, wherein the means for obtaining truck and/or driver identification data operates in response to detection of power on a harness of the chassis which is energized only when the harness is connected to a truck.

6. The system of claim 1, further comprising an alarm that generates an audible alarm if the lockout mechanism is physically tampered with.

7. The system of claim 1, further comprising an audible alarm that sounds if a seven way or galdhand connector for the chassis or trailer is connected to the truck without the driver first receiving authorization to connect the truck to the chassis.

8. The system of claim 1, wherein the lockout mechanism is included in a master device associated with and attached to the forward part of the chassis or trailer.

9. The system of claim 1, wherein the lockout mechanism physically prevents the driver from connecting the truck's seven way or gladhand connector to the chassis or trailer.

10. The system of claim 1, wherein the lockout mechanism includes a physical cover that clamps around/over a chassis seven way or gladhand connector to prevent mating of the seven way or gladhand connector of the truck and the chassis or trailer.

11. A method of associating a chassis or trailer with a truck connecting to the chassis or trailer and providing information to a server that indicates the connection so as to begin an association between the truck and the chassis or trailer, the method comprising:
    obtaining truck and/or driver identification data by performing Radio Frequency Identification Data (RFID) interrogation of a tag or device associated with the truck and/or driver;
    communicating the truck and/or driver identification data to a server that runs software that identifies, verifies and records the identification data of the driver and/or truck, associates the truck with the chassis or trailer, and obtains authorization for the driver to connect the truck to the chassis or trailer; and
    receiving the authorization and unlocking a locking mechanism that covers a seven way or gladhand connector that connects the truck to the chassis or trailer.

12. The method of claim 11, wherein the obtaining truck and/or driver identification data uses a master device coupled to the chassis or trailer and a slave device coupled to the truck, wherein when the master device and the slave device are in close proximity to each other the master device interrogates the slave device to obtain the truck and/or driver identification data.

13. The method of claim 11, wherein the obtaining truck and/or driver identification data uses a master device coupled to the chassis or trailer and including an interface that interrogates an Near Field Communication (NFC) enabled mobile device associated with the driver which communicates with the master device to provide the truck and/or driver identification data.

14. The method of claim 11, wherein the locking mechanism is a seven way or gladhand connector lockout mechanism.

15. The method of claim 11, wherein the obtaining truck and/or driver identification data is performed in response to detection of power on a harness of the chassis which is energized only when the harness is connected to a truck.

16. The method of claim 11, further comprising generating an alarm if the lockout mechanism is physically tampered with.

17. The method of claim 11, further comprising generating an alarm if a seven way or gladhand connector for the chassis is connected to the truck without the driver first receiving authorization to connect the truck to the chassis or trailer.

18. The method of claim 11, wherein the lockout mechanism is included in a master device associated with and attached to the forward part of the chassis or trailer.

19. The method of claim 11, wherein the lockout mechanism physically prevents the driver from connecting the truck's seven way or gladhand connector to the chassis.

20. The method of claim 11, wherein the lockout mechanism includes a physical cover that clamps around/over a chassis or trailer seven way or gladhand connector to prevent mating of the seven way or gladhand connector of the truck and the chassis or trailer.

21. A system that enables associating at least two shipping assets with one another at a time that the assets are connected to facilitate monitoring of the assets, the system comprising:

a master device coupled to a first asset, the master device including a Radio Frequency Identification Data (RFID) component that interrogates at least one identification source to identify a second asset or driver associated with the second asset, at least one server that receives data from the master device over a communication network, determines whether the driver is authorized to associate the first asset with the second asset and communicate to the master device a result of the determination, wherein the master device receives the result of the determination and enables coupling of the first and second asset.

22. The system of claim 21, wherein the association between the master and slave device denotes one of a chassis/truck association, trailer/truck association, container/truck association, chassis/container association, chassis/truck association, or an association for at least one generator set/refrigerated container.

* * * * *